United States Patent [19]
Tysdal

[11] 4,107,826
[45] Aug. 22, 1978

[54] FLEXIBLE COVERING ANCHOR

[76] Inventor: Daryl D. Tysdal, P. O. Box 5286, Texarkana, Tex. 75501

[21] Appl. No.: 871,693

[22] Filed: Jan. 23, 1978

[51] Int. Cl.² .................. A44B 21/00; A47H 13/01
[52] U.S. Cl. ........................... 24/243 K; 24/201 C; 160/395; 160/399
[58] Field of Search ............... 24/243 K, 201 HH; 160/392, 395, 399

[56] References Cited
U.S. PATENT DOCUMENTS

| | | | |
|---|---|---|---|
| 3,302,260 | 2/1967 | Cuddeback | 24/243 K |
| 3,911,631 | 10/1975 | Cooper | 24/243 K |

*Primary Examiner*—Bernard A. Gelak
*Attorney, Agent, or Firm*—Clarence A. O'Brien; Harvey B. Jacobson

[57] ABSTRACT

A two-piece assembly is provided for attaching sheet material, such as polyethylene film, to greenhouses and the like. An elongated base member is secured to a support and includes a channel longitudinally therealong for receiving a portion of the sheet material therein and which also receives a material holding element having a transverse configuration corresponding to that of the channel, the member and the element cooperating to releasably clamp the portion of the material in the channel. The element is nested in the channel in a manner such that no further tension on the material or further clamping is necessary to insure a positive holding action. The element is further designed to facilitate easy removal or replacement of the sheet material without the use of special tools or screwdrivers. The two-piece assembly is further designed to facilitate the adjustment and/or repositioning of the material upon partial rotation of the material holding element relative to the channel defining base member without the necessity of removing the material holding element or completely releasing the material.

9 Claims, 5 Drawing Figures

U.S. Patent  Aug. 22, 1978  4,107,826
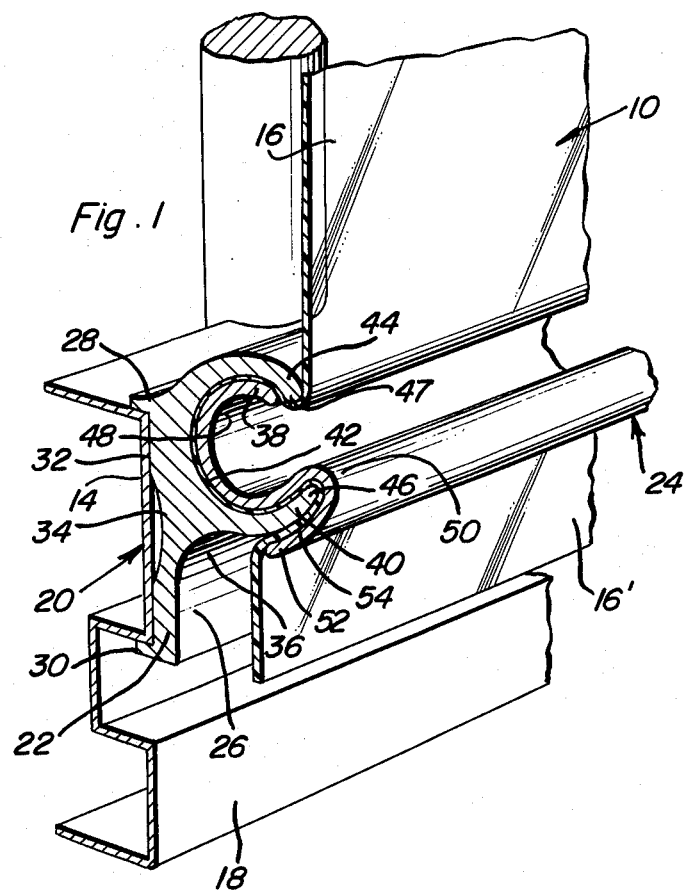
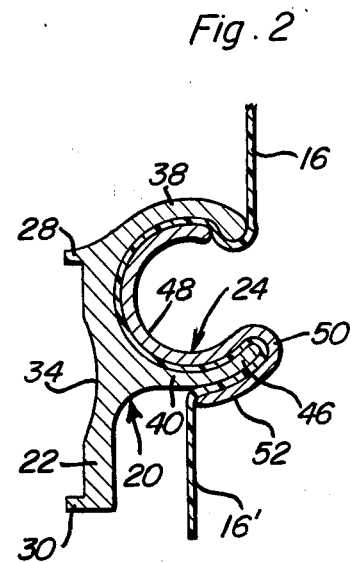
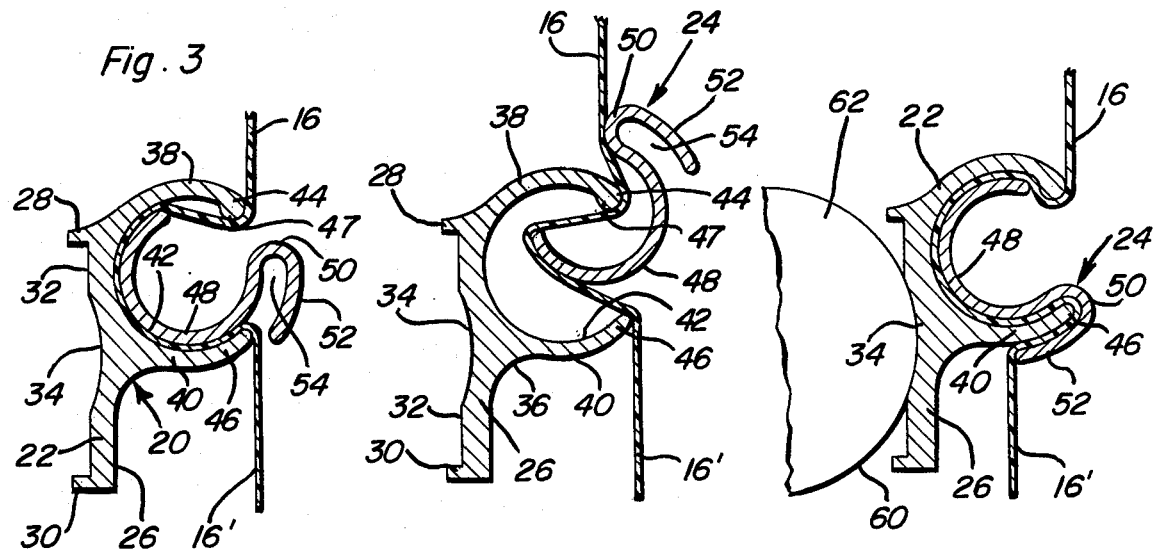

FLEXIBLE COVERING ANCHOR

BACKGROUND OF THE INVENTION

This invention relates to an assembly for attaching sheet material to a support, and an example of which is the construction of a temporary or semi-permanent greenhouse structure comprised of a framework over which sheet material, such as polyethylene film, is stretched to form an enclosure. Frequently these structures are provided with various temperature and other atmospheric controlling devices which require that the enclosure be relatively tight to seal out the outside weather. However, these structures must also be of a nature that permits at least partial disassembly during the off-season which at the same time being low cost from both the standpoint of materials used and the labor involved in assembly and partial and complete disassembly.

In this connection, it has become a readily accepted practice to employ the use of polyethylene film which heretofore has been attached to a framework through the use of laths or strips of wood which are nailed to the support in such a manner that the film disposed between the lath and support are thus held in place. This has been less than satisfactory, however, because of the tendency for the plastic material to tear at the point that the nails are driven through the laths and the film and because of the wind action which tends to cause the film to pull loose thus making the structure less than airtight in addition to damaging the polyethylene film.

Another method has been devised to secure the film and involves the use of interlocking components for clamping the plastic material therebetween and with one of the components being adapted or supported from the greenhouse structure and the other component being releasably interlockingly engaged with the first component. These interlocking components, however, are less than satisfactory inasmuch as the two components thereof must be disassembled by the use of specific hand tools. Such interlocking components have also been less than satisfactory inasmuch as once a film portion is secured in place, no adjustment or repositioning of the film can take place in order to smooth out, readjust or tighten the film over the structure.

Examples of two-piece interlocking material anchors as well as other anchors utilizing some of the general structural and operational features of the instant invention are disclosed in U.S. Pat. Nos. 946,312, 3,612,539, 3,803,671 and 3,965,546.

BRIEF DESCRIPTION OF THE INVENTION

The anchor structure of the instant invention includes a rigid base member for attachment to the structure over which sheet material is to be applied and also a material holding element releasably engageable with the base member for shifting between a fully seated sheet material anchoring position, a partially released sheet material adjusting position and a full release position enabling ready disengagement of the material holding element from the material holding element. Further, the material holding element may be readily shifted from the fully seated sheet material anchoring position toward the partially released and full release positions merely by manually rotating the material holding element relative to the base member, which manual rotation may be readily effected either by manual manipulation of the material holding element or an upward pull on the free marginal edge of the sheet material anchored in position by means of the anchor.

The main object of this invention is to provide a flexible covering anchor which may be utilized in securing polyethylene film or similar sheet material over a framework.

Yet another object of the invention is to provide an anchor including a partially released condition thereof enabling readjusting or tightening of the associated sheet material without relative movement of the anchor component to a full release position.

Still another object of this invention is to provide an anchor in accordance with the preceding objects and including structure whereby the anchor components may be relatively shifted to full release positions without the use of tools.

Another very important object of this invention is to provide an anchor for sheet material in which the sheet material may be clamped and held against slippage without damage to the sheet material either by the puncturing of holes therein or by excessively stretching localized areas of the sheet material.

Still another important object of this invention is to provide a sheet material anchor in which the associated sheet material may be positively held and in which increased tension on the material is not necessary to increase the grip of the anchor on the sheet material.

Still another object of this invention is to provide an anchor in accordance with the preceding objects and constructed in a manner whereby adjusting, repositioning or tightening of the associated sheet material may be effected without complete disassembly of the two components of the anchor.

Still another important object of this invention is to provide a two-piece sheet material anchor which may be releasably engaged with each other and function as a sheet material anchor even though one or both of the two pieces of anchor are slightly bent.

A final object of this invention to be specifically enumerated herein is to provide an anchor in accordance with the preceding objects and which will conform to conventional forms of manufacture, be of simple construction and easy to use so as to provide a device that will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of a greenhouse or the like employing the use of a sheet material covering, such as polyethylene film, which is attached to a framework of the greenhouse through the use of an anchor constructed in accordance with the present invention;

FIG. 2 is a vertical sectional view of the anchor and the associated portion of the sheet material and with the material holding element of the anchor in fully seated sheet material anchoring position relatively to the base member of the anchor;

FIG. 3 is a vertical sectional view similar to FIG. 2 but with the material holding element in a partially released sheet material adjusting and tightening position relative to the base member of the anchor;

FIG. 4 is a vertical sectional view similar to FIG. 2 but with the material holding element in a full release position for complete disengagement from the base member of the anchor; and FIG. 5 is a fragmentary vertical sectional view similar to FIG. 2 but illustrating the manner in which the base member of the anchor may be supported from and conform to the radius of curvature of a cylindrical support member.

DETAILED DESCRIPTION OF THE INVENTION

Referring now more specifically to the drawings, the numeral 10 generally designates a greenhouse including a frame 14 over which a flexible sheet 16 is secured. The frame 14 includes a horizontal support member 18 supported therefrom and the sheet material 16 is anchored relative to the support member 18 by means of an anchor assembly referred to in general by the reference numeral 20. The anchor assembly comprises an elongated base member 22 secured to the support member 18 in any convenient manner and an elongated material holding element referred to in general by the reference numeral 24. The base member may be conveniently constructed of a substantially non-deformable material such as aluminum and may be manufactured by extrusion process. In addition, the material holding element 24 is also constructed of a substantially non-deformable material such as aluminum and may also be manufactured by extrusion process.

The base member 22 includes an upstanding base flange 26 including upper and lower horizontally outwardly projecting lips 28 and 30 extending outwardly from the rear side 32 of the base flange 26. In addition, the rear side 32 of the base flange 26 includes a longitudinal concave arcuate depression 34 for a purpose to be hereinafter more fully set forth.

The front side 36 of the base flange 26 includes upper and lower arcuate arms 38 and 40 which project outwardly therefrom and the arms 38 and 40 define a partial cylindrical recess 42 of approximately 270° angular extent and include spaced apart free ends 44 and 46, respectively. The free end 44 of the arm 38 includes an inwardly projecting integral lip 47.

The material holding element 24 includes a partial cylindrical portion 48 of approximately 260° angular extent and one marginal edge of the partial cylindrical portion 48 terminates in an outturned lengthwise extending integral reversely bent portion 50 which in turn terminates in a lengthwise extending arcuate tongue portion 52 overlying and spaced relative to the outer surface of the portion 48. A lengthwise extending pocket 54 is defined between the tongue portion 52 and the adjacent portion of the portion 48.

The portion 48 of the material holding element 24 is snugly receivable within the recess 42 in the manner illustrated in FIGS. 2 and 5 of the drawings with only a slight spacing between the outer surface of the portion 48 and the inner surfaces of the arms defining the recess 42. The spacing between these surfaces is substantially equal to, but possibly slightly greater than, the thickness of the sheet 16.

When it is desired to utilize the anchor assembly 20 in order to anchor the free marginal edge 16' of the sheet 16 to the anchor assembly 20, the free marginal edge 16' is draped over the base member 22 and the partial cylindrical portion 48 of the material holding element 24 is advanced inwardly toward the recess and engaged with the portion of the sheet 16 spanning across the opening of the recess defined between the free ends 44 and 46. Further inward movement of the partial cylindrical portion 48 to the left as viewed in FIG. 4 of the drawings causes that portion of the marginal edge portion 16' extending across the opening of the recess 42 to be deflected inwardly into the latter. Thereafter, the material holding element 24 has its portion 48 further displaced into recess 42 while the material holding element 24 is rotated in a clockwise direction as viewed in FIG. 4 of the drawings whereby the material holding element will seat in the inner portion of the recess 42 in the manner illustrated in FIG. 3 of the drawings. In this position, the material holding element 24 is in a partially released position. Thereafter, the material holding element 24 is further rotated in a clockwise direction from the position thereof illustrated in FIG. 3 of the drawings to the position thereof illustrated in FIG. 2 of the drawings wherein the marginal edge of the partial cylindrical portion 48 will gently clamp the sheet material 16 between the partial cylindrical portion 48 and the lip 46. Further, when the material holding element 24 is in the fully seated position illustrated in FIG. 2, the free end 46 of the arm 40 is fully seated within the pocket 54 and thus further clamps the sheet material 16 between the surfaces of the material holding element 24 defining the pocket 54 and the inner, outer and end surfaces of the free end of the arm 40. When the material holding element 24 is in the fully seated sheet material anchoring position illustrated in FIG. 1 of the drawings, tension forces acting upon the sheet material 16 in an upward direction away from the anchor assembly 20 are fully overcome by the anchor assembly and the latter thereby securely fastens the sheet material 16 to the support member 18 from which the base member 22 of the anchor assembly is supported.

When it is desired to shift the sheet material 16 relative to the base member 22, either for the purpose of smoothing the sheet material 16 or tightening the latter, the material holding element 24 is rotated in a counterclockwise direction relative to the base member 22 from the position of the material holding element 24 illustrated in FIG. 2 of the drawings to the position thereof illustrated in FIG. 3. In this position, the material holding element 24 is retained in interlocked engagement with the base member 22, but the free marginal edge 16' of the sheet material 16 may be pulled downwardly in order to tighten the sheet material 16. Thereafter, the material holding element may again be rotated in a clockwise direction to the fully seated position thereof illustrated in FIG. 2.

If it is desired to completely remove the sheet material 16 from the frame 14, the material holding element 24 is rotated in a counterclockwise direction from the position thereof illustrated in FIG. 2 of the drawings to the position thereof illustrated in FIG. 4 and the material holding element 24 is at the same time withdrawn outwardly through the opening defined between the free ends 44 and 46 of the arms 38 and 40.

With attention now invited more specifically to FIG. 5 of the drawings, it may be seen that the base flange 26 of the base member 22 may be fully seated against and secured to a partially cylindrical surface 60 of a greenhouse structural member 62, if desired. In addition to being adaptable for use in anchoring polyethylene film to a greenhouse frame, the anchor assembly 20 may also be utilized in other environments where it is desired to anchor a piece of sheet material in position for use as a swimming pool cover, a silo cover or for construction protection. Further, the base member 22 and material holding element 24 may be of any desired length and the material holding element 24 may be said to be of S-shaped transverse cross section. Of course, the external radius of curvature of the portion 48 of the material holding element 24 is somewhat less than the radius of curvature of the partial cylindrical recess and the radius of curvature of the inner surface of the tongue portion 52 is slightly greater than the radius of curvature of the outer surface of the arm 40.

Inasmuch as the marginal portion of the portion 48 remote from the reversely bent portion 50 gently clamps the material 16 against the lip 46, the sheet material 16 is tightly clamped in position between two portions of the material holding element 24 and the base 22 in addition to being lightly clamped between the partial cylindrical portion 48 and the opposing surfaces of the base member 22 defining the recess 42. Further, as hereinbefore set forth, the material holding element 24 may be readily manually rotated between the positions thereof illustrated in FIGS. 2 and 3 of the drawings, and a slight upward and outward pull on the marginal edge portion 16' of the material 16 is sufficient to cause movement of the material holding element 24 from the fully seated position of FIG. 2 to the partially released position of FIG. 3.

From the foregoing description, it will be appreciated that there has been disclosed herein a novel assembly for the attachment of polyethylene film or other sheet material which permits quick and economical installation of the same in a positive manner, does not have a tendency to become loose or otherwise unattached and does not require puncturing or otherwise tearing or deforming of the material in order to firmly attach the same. The assembly 20 is particularly well suited for use in providing relatively airtight enclosures which are of a temporary nature and which are subject to repeated assembly and disassembly. The interlocking features of the assembly 20 permits unlimited use thereof inasmuch as the assembly 20 is not susceptible to damage during the course of normal use.

It has been further shown that no special tools are required for assembly or disassembly. Further, the material anchored through the utilization of the assembly 20 may be adjusted, tightened and smoothed without loosing control of the material. Also, the assembly 20 can be used even with minor warping or bending of either the base 22 or the material holding element 24, this being due to the unique cam action of the material holding element 24 into the recess 42.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A sheet material attaching assembly including a rigid, shape-retaining base member adapted to be attached to a support and having a substantially non-deformable, transverse configuration, said base having a channel defined therein for receiving a portion of sheet material therein, a rigid, shape-retaining material holding element including a first portion insertable into said channel and having a substantially non-deformable, transverse configuration similar to that of said channel whereby said element is nested in said channel when inserted therein, said channel being generally C-shaped in transverse configuration and said element portion being C-shaped in exterior transverse configuration and snugly receivable within said channel through the open side thereof with clearance between the opposing surfaces of said element portion and said channel to tightly receive a sheet of material therebetween, said element including, at the open side of said element portion, a reversely directed outer tongue portion overlying, extending lengthwise along and generally paralleling the corresponding side of said element portion and defining a pocket extending along and opening outwardly away from said open side, at least one side of said channel being defined by an arcuate arm portion of said base, said arm portion being snugly receivable in said pocket with clearance between said arm portion and the opposing surfaces of said pocket to tightly receive a sheet of material therebetween.

2. The combination of claim 1 wherein said tongue is formed integrally with said element portion.

3. The combination of claim 1 wherein said material holding element including said element portion and said tongue comprise an elongated strip of rigid material generally S-shaped in transverse configuration and of substantially constant thickness.

4. The combination of claim 1 wherein the other side of said channel includes a slightly inwardly projecting lip extending therealong closely adjacent the open side of said channel against which the longitudinal edge of said element portion remote from said tongue may abut to limit angular displacement of said element portion within said channel.

5. The combination of claim 4 wherein said portion of said holding element is of an angular extent relative to the angular extent of said channel whereby the longitudinal edge of said holding element portion remote from said reversely directed portion will closely oppose said lip as said material holding element is rotated within said channel to a position with the free end of said arm portion closely opposing the inner end of said pocket.

6. A sheet material anchor assembly including an elongated rigid base member defining a channel therein opening laterally outwardly of one longitudinal side of said base member, said channel being generally partial cylindrical in transverse configuration and of more than 225° angular extent, an elongated material holding element including a longitudinal portion thereof laterally insertable within said channel from exteriorly thereof, said element portion including a partial cylindrical outer surface of a radius of curvature slightly less than the radius of curvature of the interior of said channel and of an angular extent at least generally equal to the angular extent of said channel, said element portion being rotatable within the said channel into and out of operative position with said partial cylindrical outer surface substantially fully registered with the partial cylindrical surface of said channel.

7. The combination of claim 6 wherein said base member and holding element include coacting means operative to limit rotation of said element relative to said base member in one direction with said element in said operative position.

8. The combination of claim 6 wherein said element is generally C-shaped in transverse configuration.

9. The combination of claim 8 wherein said C-shaped element includes one longitudinal marginal portion provided with an integral outturned and backturned arcuate tongue portion generally paralleling the adjacent element portion and defining, between the latter and said tongue portion, a pocket extending longitudinally of said element, one side of said channel being defined by an arcuate arm portion of said base, said arm portion, when said element is in said operative position, being substantially fully seated in said pocket in slightly spaced relation relative to the surfaces of said holding element bounding said pocket.

* * * * *